United States Patent
Kageyama

(10) Patent No.: US 12,444,794 B2
(45) Date of Patent: Oct. 14, 2025

(54) SECONDARY BATTERY AND METHOD OF MANUFACTURING THE SAME

(71) Applicant: MURATA MANUFACTURING CO., LTD., Kyoto (JP)

(72) Inventor: Masayuki Kageyama, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 702 days.

(21) Appl. No.: 17/680,709

(22) Filed: Feb. 25, 2022

(65) Prior Publication Data

US 2022/0181726 A1 Jun. 9, 2022

Related U.S. Application Data

(63) Continuation of application No. PCT/JP2020/033539, filed on Sep. 4, 2020.

(30) Foreign Application Priority Data

Sep. 30, 2019 (JP) .................... 2019-180790

(51) Int. Cl.
*H01M 50/178* (2021.01)
*H01M 10/0587* (2010.01)
(Continued)

(52) U.S. Cl.
CPC ..... *H01M 50/178* (2021.01); *H01M 10/0587* (2013.01); *H01M 50/105* (2021.01);
(Continued)

(58) Field of Classification Search
CPC .......... H01M 50/178; H01M 10/0587; H01M 50/105; H01M 50/107; H01M 50/136;
(Continued)

(56) References Cited

U.S. PATENT DOCUMENTS

2017/0200970 A1* 7/2017 Tamachi et al. .... H01M 10/058

FOREIGN PATENT DOCUMENTS

JP 2008171579 A 7/2008
JP 2008277062 A 11/2008
(Continued)

OTHER PUBLICATIONS

International Search Report of corresponding PCT application PCT/JP2020/033539, dated Nov. 24, 2020.
(Continued)

*Primary Examiner* — Matthew T Martin
*Assistant Examiner* — Alexandra J Simmons
(74) *Attorney, Agent, or Firm* — K&L Gates LLP

(57) ABSTRACT

A secondary battery includes a battery device, an outer package member, a positive electrode wiring line, and a negative electrode wiring line. The battery device includes a positive electrode and a negative electrode. The outer package member has flexibility, and accommodates the battery device. The outer package member includes a seal part at one end, and includes no seal part at any position other than the one end. The positive electrode wiring line is coupled to the positive electrode and led to an outside of the outer package member via the seal part. The negative electrode wiring line is coupled to the negative electrode and led to the outside of the outer package member via the seal part. The outer package member has a flat and columnar shape. In the seal part, mutually opposed portions of the outer package member are joined to each other.

13 Claims, 7 Drawing Sheets

(51) Int. Cl.
- *H01M 50/105* (2021.01)
- *H01M 50/107* (2021.01)
- *H01M 50/136* (2021.01)
- *H01M 50/179* (2021.01)
- *H01M 50/184* (2021.01)
- *H01M 50/186* (2021.01)

(52) U.S. Cl.
CPC ....... *H01M 50/107* (2021.01); *H01M 50/136* (2021.01); *H01M 50/179* (2021.01); *H01M 50/184* (2021.01); *H01M 50/186* (2021.01)

(58) Field of Classification Search
CPC . H01M 50/179; H01M 50/184; H01M 50/186
See application file for complete search history.

(56) References Cited

FOREIGN PATENT DOCUMENTS

| | | |
|---|---|---|
| JP | 2015115293 A | 6/2015 |
| JP | 2017126558 A | 7/2017 |
| JP | 2017130415 A | 7/2017 |

OTHER PUBLICATIONS

Japanese Office Action issued Nov. 22, 2022 in corresponding Japanese Application No. 2021-550498.
Chinese Office Action issued Oct. 12, 2023 in corresponding Chinese Application No. 202080060733.8.
Chinese Office Action issued Mar. 8, 2024 in corresponding Chinese Application No. 202080060733.8.

* cited by examiner

SECONDARY BATTERY AND METHOD OF MANUFACTURING THE SAME

CROSS REFERENCE TO RELATED APPLICATIONS

The present application is a continuation of PCT patent application no. PCT/JP2020/033539, filed on Sep. 4, 2020, which claims priority to Japanese patent application no. JP2019-180790, filed on Sep. 30, 2019, the entire contents of which are being incorporated herein by reference.

BACKGROUND

The present technology generally relates to a secondary battery, and to a method of manufacturing the same.

Various electronic apparatuses such as mobile phones have been widely used. Such widespread use has promoted development of a secondary battery as a power source that is smaller in size and lighter in weight and allows for a higher energy density. A configuration of the secondary battery influences a battery characteristic. Accordingly, various considerations have been given to the configuration of the secondary battery.

Specifically, in order to achieve downsizing, a wound electrode body is contained inside an outer package material having flexibility, and the outer package material is sealed at four sides or three sides. In this case, a positive electrode lead and a negative electrode lead are led out from the outer package material toward respective directions opposite to each other.

In order to increase an energy density, a wound electrode body is contained inside a laminated-film outer package body, and the laminated-film outer package body is sealed at two locations that face toward respective directions opposite to each other. In this case, a positive electrode terminal and a negative electrode terminal are led out from the laminated outer package body toward respective directions opposite to each other.

In order to achieve downsizing and increase the energy density, an electrode body is contained inside a laminated film, and the laminated film is sealed at four sides. In this case, the positive electrode terminal and the negative electrode terminal are led out from the laminated film toward respective directions opposite to each other.

SUMMARY

The present technology generally relates to a secondary battery, and to a method of manufacturing the same.

Various considerations have been made to solve problems of the secondary battery; however, the secondary battery has not yet achieved a sufficient energy density per unit volume, and there is still room for improvement in terms thereof.

The technology has been made in view of such an issue and it is an object of the technology to provide a secondary battery and a method of manufacturing the same that make it possible to increase the energy density per unit volume.

A secondary battery according to an embodiment of the technology includes a battery device, an outer package member, a positive electrode wiring line, and a negative electrode wiring line. The battery device includes a positive electrode and a negative electrode. The outer package member has flexibility, and accommodates the battery device. The outer package member includes a seal part at one end, and includes no seal part at any position other than the one end. The positive electrode wiring line is coupled to the positive electrode and led to an outside of the outer package member via the seal part. The negative electrode wiring line is coupled to the negative electrode and led to the outside of the outer package member via the seal part. The outer package member has a flat and columnar shape. In the seal part, mutually opposed portions of the outer package member are joined to each other.

A method of manufacturing a secondary battery according to an embodiment of the technology includes: placing a battery device including a positive electrode and a negative electrode into an outer package member having flexibility, where the outer package member is formed by a deep drawing process, having a flat and columnar shape, and having an opening at one end; and sealing the opening of the outer package member into which the battery device is placed.

According to the secondary battery of an embodiment of the technology as described herein, the battery device is accommodated inside the outer package member having flexibility and having a flat and columnar shape. The outer package member includes the seal part at one end, and includes no seal part at any position other than the one end. Further, the positive electrode wiring line coupled to the positive electrode is led to the outside of the outer package member via the seal part, and the negative electrode wiring line coupled to the negative electrode is led to the outside of the outer package member via the seal part. In the seal part, mutually opposed portions of the outer package member are joined to each other. Accordingly, it is possible to increase the energy density per unit volume.

Further, according to the method of manufacturing a secondary battery of the embodiment of the technology, the battery device is placed into a flexible outer package member formed by means of a deep drawing process and having a flat and columnar shape, following which the opening is sealed. Accordingly, it is possible to manufacture the secondary battery with increased energy density per unit volume.

It should be understood that effects of the technology are not necessarily limited to those described above and may include any of a series of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to an embodiment of the technology.

Described here is a secondary battery having a flat and columnar shape. Examples of the secondary battery include a so-called coin-type secondary battery and a so-called button-type secondary battery. As will be described later, the flat and columnar secondary battery includes a pair of bottom parts and a sidewall part. The bottom parts are opposed to each other. The sidewall part lies between the bottom parts. This secondary battery has a height that is small relative to an outer diameter.

A charge and discharge principle of the secondary battery is not particularly limited. The secondary battery described below obtains a battery capacity by utilizing insertion and extraction of an electrode reactant. The secondary battery includes a positive electrode, a negative electrode, and an electrolytic solution. In the secondary battery, in order to prevent precipitation of the electrode reactant on a surface of the negative electrode in the middle of charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not limited to a particular kind, the electrode reactant is a light metal, such as an alkali metal or an alkaline earth metal. Examples of the alkali metal include lithium, sodium, and potassium. Examples of the alkaline earth metal include beryllium, magnesium, and calcium.

In the following, a description is given of an example case where the electrode reactant is lithium. A secondary battery that obtains a battery capacity by utilizing insertion and extraction of lithium is a so-called lithium-ion secondary battery. In the lithium-ion secondary battery, lithium is inserted and extracted in an ionic state.

Figure 1:
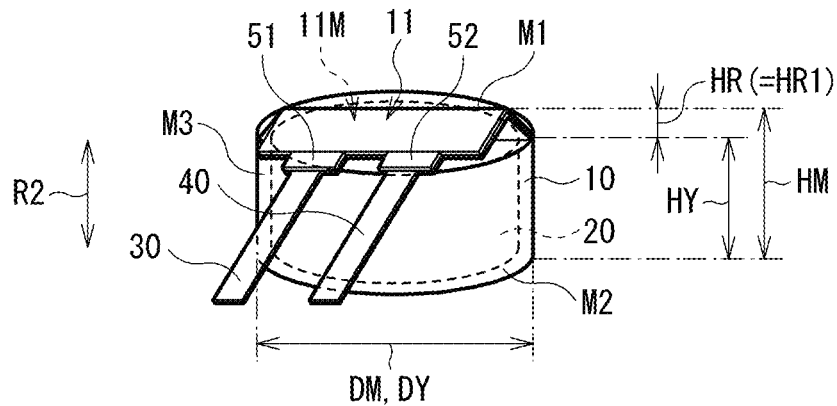
FIG. 1 is a perspective view of a configuration of a secondary battery according to an embodiment of the technology.
Figure 2:
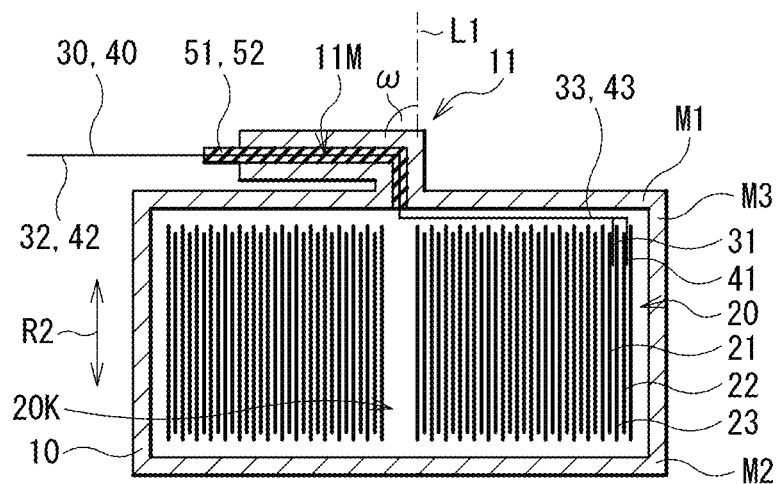
FIG. 2 is a sectional view of the configuration of the secondary battery illustrated in FIG. 1.
Figure 3:
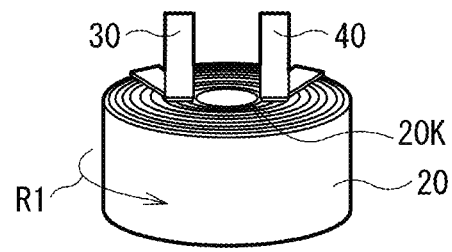
FIG. 3 is a perspective view of a configuration of a battery device illustrated in FIG. 1.
Figure 4:
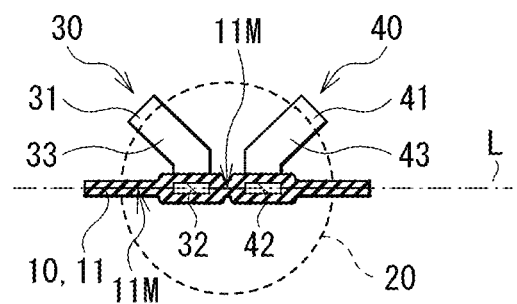
FIG. 4 is a schematic partial sectional view of the configuration of the secondary battery illustrated in FIG. 1.
Figure 5:
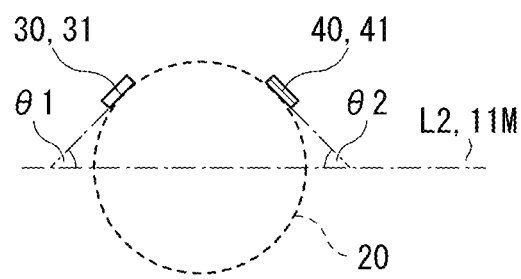
FIG. 5 is another schematic partial sectional view of the configuration of the secondary battery illustrated in FIG. 1.

FIG. 1 is a perspective view of a configuration of the secondary battery. FIG. 2 is a sectional view of the configuration of the secondary battery illustrated in FIG. 1. FIG. 3 is a perspective view of a configuration of a battery device 20 illustrated in FIG. 1. FIGS. 4 and 5 each schematically illustrate a partial sectional configuration of the secondary battery illustrated in FIG. 1.

For simplifying the illustration, a positive electrode 21, a negative electrode 22, a separator 23, a positive electrode lead 30, and a negative electrode lead 40, which will be described later, are each illustrated in a linear shape in FIG. 2.

FIG. 4 illustrates only some of components of the secondary battery, more specifically, only an outer package film 10 (a seal part 11), the battery device 20, the positive electrode lead 30, and the negative electrode lead 40. In this case, a section of each of the outer package film 10 (the seal part 11), the positive electrode lead 30, and the negative electrode lead 40 is also illustrated. For the battery device 20, only an outer edge (an outline) thereof in the course of winding is illustrated in a broken line.

FIG. 5 illustrates only some of the components of the secondary battery, more specifically, only the positive electrode lead 30 (a lead part 31) and the negative electrode lead 40 (a lead part 41). For the battery device 20, only the outer edge thereof in the course of winding is illustrated, as in FIG. 4.

For convenience, the following description is given with an up direction in FIGS. 1 and 2 as an upper side of the secondary battery, and a down direction in FIGS. 1 and 2 as a lower side of the secondary battery.

The secondary battery is a button-type secondary battery, and therefore, as illustrated in FIGS. 1 and 2, has a flat and columnar three-dimensional shape with a height (a maximum height) HM thereof small relative to an outer diameter (a maximum outer diameter) DM thereof. Here, the secondary battery has a flat and cylindrical (circular columnar) three-dimensional shape. Although dimensions of the secondary battery are not particularly limited, the outer diameter (here, the diameter of the circular shape) DM is from 3 mm to 30 mm both inclusive, and the height HM is from 0.5 mm to 70 mm both inclusive. It should be understood that a ratio of the outer diameter DM to the height HM, i.e., DM/HM, is greater than 1 and smaller than or equal to 25.

Specifically, the secondary battery includes the outer package film 10, the battery device 20, the positive electrode lead 30, the negative electrode lead 40, and sealing films 51 and 52. The secondary battery described here is a laminated-film-type secondary battery in which an outer package member having flexibility or softness, i.e., the outer package film 10, is used to contain the battery device 20 therein.

As illustrated in FIGS. 1 and 2, the outer package film 10 is an outer package member that contains the battery device 20 and, as described above, has a flat and columnar shape with flexibility. Here, the outer package film 10 is a single member. Further, the outer package film 10 has a hollow, flat and generally cylindrical three-dimensional shape in accordance with the three-dimensional shape of the secondary battery described above.

The outer package film 10 which is generally cylindrical in shape thus includes a pair of bottom parts M1 and M2 and a sidewall part M3. The sidewall part M3 is coupled to the bottom part M1 at one end, and is coupled to the bottom part M2 at the other end. Because the outer package film 10 has a flat and cylindrical shape as described above, the bottom parts M1 and M2 are each generally circular in plan shape, and a surface of the sidewall part M3 is a convex curved surface.

The outer package film 10 includes one or more of materials including, without limitation, metals and polymer compounds. The outer package film 10 may thus be a metal foil, a polymer film, or a stacked body including a metal foil and a polymer film stacked on each other. In other words, the outer package film 10 may be a single-layered film or a multilayered film.

Specifically, the outer package film 10 is a three-layer laminated film in which a fusion-bonding layer, a metal layer, and a surface protective layer are stacked in this order from an inner side. The fusion-bonding layer is a polymer compound film including, without limitation, polypropylene. The metal layer is a metal foil including, without limitation, aluminum. The surface protective layer is a polymer film compound including, without limitation, nylon. However, the number of the layers of the outer package film 10 which is a laminated film is not limited to three, and may be two, or may be four or more.

In particular, the outer package film 10 is shaped like a pouch, including the seal part 11 at one end (a top end in FIGS. 1 and 2) in an intersection direction R2 intersecting a winding direction R1 (FIG. 3) to be described later, and including no seal part 11 at any position other than the one end.

Here, the outer package film 10 has an opening 10K (see, e.g., FIG. 7A) at the above-described one end; therefore, in the seal part 11, portions of the outer package film 10 that are mutually opposed at the opening 10K are joined to each other. The opening 10K of the outer package film 10 is thereby sealed to provide the seal part 11. The outer package film 10 described here thus has an enclosed structure sealed only at one location (one side), that is, a one-side-seal-type enclosed structure.

The seal part 11 is preferably provided at one of the bottom parts M1 and M2 in the outer package film 10 having a flat and columnar shape. A reason for this is that this increases a device space volume to be described later and facilitates smooth placing of the battery device 20 into the outer package film 10 in a process of manufacturing the secondary battery, as compared with a case where the seal part 11 is provided at the sidewall part M3.

A method of joining the mutually opposed portions of the outer package film 10 to each other to form the seal part 11 is not particularly limited; however, one or more of methods including, without limitation, a thermal fusion bonding method and a welding method may be used. Examples of the welding method include a laser welding method and a resistance welding method.

In order to provide the one-side-seal-type enclosed structure described above, the outer package film 10 is formed by performing a deep drawing process on a material such as a laminated film. The deep drawing process forms a so-called deep drawn part in the laminated film, thus forming the outer package film 10 having a hollow cylindrical shape with the opening 10K at one end.

The seal part 11 includes a joint surface 11M. The joint surface 11M is provided by joining of the portions of the outer package film 10 mutually opposed at the opening 10K to each other. In the seal part 11, as will be described later, the mutually opposed portions of the outer package film 10 are so joined to each other as to sandwich each of the positive electrode lead 30 and the negative electrode lead 40.

The seal part 11 is preferably bent to allow the joint surface 11M to be inclined with respect to the intersection direction R2. A reason for this is that a loss height HR is thereby made smaller than in a case where the seal part 11 is not bent. This allows an effective height HY to be large relative to the height HM, and consequently increases the device space volume. The "device space volume" refers to a volume of an internal space of the outer package film 10 available for containing the battery device 20 therein.

An angle ω at which the joint surface 11M is inclined with respect to the intersection direction R2 is not particularly limited. In order to clarify the definition of the angle ω, FIG. 2 illustrates the angle ω at which the joint surface 11M is inclined with respect to a line segment L1 along the intersection direction R2. The angle ω is preferably 90° or greater, in particular. A reason for this is that the height HM is thereby made smaller than in a case where the angle ω is less than 90°. As a result, the effective height HY becomes sufficiently large relative to the height HM, and therefore the device space volume sufficiently increases.

The battery device 20 is a device causing charging and discharging reactions to proceed, and includes, as illustrated in FIGS. 1 to 3, the positive electrode 21, the negative electrode 22, the separator 23, and an electrolytic solution which is a liquid electrolyte. It should be understood that FIGS. 2 and 3 each omit the illustration of the electrolytic solution.

The battery device 20 has a three-dimensional shape corresponding to the three-dimensional shape of the outer package film 10. The "three-dimensional shape corresponding to the three-dimensional shape of the outer package film 10" refers to a three-dimensional shape similar to that of the outer package film 10. A reason for allowing the battery device 20 to have such a three-dimensional shape is that this makes it harder for a so-called dead space (a gap between the outer package film 10 and the battery device 20) to result upon placing the battery device 20 in the outer package film 10 than in a case where the battery device 20 has a three-dimensional shape different from that of the outer package film 10. This allows for efficient use of the internal space of the outer package film 10, resulting in an increase in device space volume, and accordingly an increase in energy density per unit volume of the secondary battery. Here, the outer package film 10 has a flat and cylindrical three-dimensional shape as described above, and therefore the battery device 20 also has a flat and cylindrical three-dimensional shape.

The positive electrode 21 and the negative electrode 22 are wound in the winding direction R1 with the separator 23 interposed therebetween. More specifically, the positive electrode 21 and the negative electrode 22 are stacked on each other with the separator 23 interposed therebetween, and are wound, in the state of the stack, in the winding direction R1 with the separator 23 interposed between the positive electrode 21 and the negative electrode 22. The winding direction R1 is a direction of curvature of the battery device 20 along a peripheral surface thereof. Thus, the battery device 20 is a wound electrode body including the positive electrode 21 and the negative electrode 22 that are wound in the winding direction R1 with the separator 23 interposed therebetween. The battery device 20 which is a wound electrode body has a winding center space 20K extending in the intersection direction R2, as a winding core part.

It should be understood that the positive electrode 21 and the negative electrode 22 each have a height smaller than that of the separator 23. A reason for this is that this prevents a contact (a short circuit) between the positive electrode 21 and the negative electrode 22. Further, the height of the negative electrode 22 is larger than that of the positive electrode 21. A reason for this is that this prevents a short circuit between the positive electrode 21 and the negative electrode 22 caused by precipitation of lithium upon charging and discharging.

The positive electrode 21 includes a positive electrode current collector and a positive electrode active material layer. The positive electrode active material layer may be provided on each of both sides of the positive electrode current collector, or may be provided only on one side of the positive electrode current collector. The positive electrode current collector includes one or more of electrically conductive materials including, without limitation, aluminum, an aluminum alloy, and stainless steel. The positive electrode active material layer includes a positive electrode active material into which lithium is insertable and from which lithium is extractable. The positive electrode active material includes one or more of lithium-containing compounds including, without limitation, a lithium-containing transition metal compound. Examples of the lithium-containing transition metal compound include an oxide, a phosphoric acid compound, a silicic acid compound, a boric acid compound, etc. each including lithium and one or more transition metal elements as constituent elements. It should be understood that the positive electrode active material layer may further include, without limitation, a positive electrode binder and a positive electrode conductor.

The negative electrode 22 includes a negative electrode current collector and a negative electrode active material layer. The negative electrode active material layer may be provided on each of both sides of the negative electrode current collector, or may be provided only on one side of the negative electrode current collector. The negative electrode current collector includes one or more of materials including, without limitation, iron, copper, nickel, stainless steel, an iron alloy, a copper alloy, and a nickel alloy. The negative electrode active material layer includes a negative electrode active material into which lithium is insertable and from which lithium is extractable. The negative electrode active material includes one or more of materials including, without limitation, a carbon material and a metal-based material. Examples of the carbon material include graphite. The metal-based material is a material that includes, as a constituent element or constituent elements, one or more elements among metal elements and metalloid elements that are each able to form an alloy with lithium. Specifically, the metal-based material includes one or more of elements including, without limitation, silicon and tin, as a constituent element or constituent elements. The metal-based material may be a simple substance, an alloy, a compound, or a mixture of two or more thereof. It should be understood that the negative electrode active material layer may further include, without limitation, a negative electrode binder and a negative electrode conductor.

The separator 23 is an insulating porous film interposed between the positive electrode 21 and the negative electrode 22. The separator 23 allows lithium to pass therethrough while preventing a short circuit between the positive electrode 21 and the negative electrode 22. This separator 23 includes one or more of polymer compounds, including polyethylene.

The positive electrode 21, the negative electrode 22, and the separator 23 are each impregnated with the electrolytic solution. The electrolytic solution includes a solvent and an electrolyte salt. The solvent includes one or more of non-aqueous solvents (organic solvents) including, without limitation, a carbonic-acid-ester-based compound, a carboxylic-acid-ester-based compound, and a lactone-based compound. The electrolyte salt includes one or more of light metal salts, including a lithium salt.

As illustrated in FIGS. 1 to 5, the positive electrode lead 30 is a positive electrode wiring line with one end coupled to the positive electrode 21 (the positive electrode current collector) and the other end led to the outside of the outer package film 10. As described above, in the seal part 11, the portions of the outer package film 10 mutually opposed at the opening 10K are so joined to each other as to sandwich the positive electrode lead 30. The positive electrode lead 30 is thus led from the inside to the outside of the outer package film 10 via the seal part 11. The positive electrode lead 30 includes a material similar to the material included in the positive electrode 21 (the positive electrode current collector). It should be understood that a coupling position of the positive electrode lead 30 to the positive electrode 21 is not particularly limited, and may be freely chosen.

As illustrated in FIGS. 1 to 5, the negative electrode lead 40 is a negative electrode wiring line with one end coupled to the negative electrode 22 (the negative electrode current collector) and the other end led to the outside of the outer package film 10. As described above, in the seal part 11, the portions of the outer package film 10 mutually opposed at the opening 10K are so joined to each other as to sandwich the negative electrode lead 40. The negative electrode lead 40 is thus led from the inside to the outside of the outer package film 10 via the seal part 11. The negative electrode lead 40 includes a material similar to the material included in the negative electrode 22 (the negative electrode current collector). It should be understood that a coupling position of the negative electrode lead 40 to the negative electrode 22 is not particularly limited, and may be freely chosen.

In other words, the positive electrode lead 30 and the negative electrode lead 40 are each led out from the outer package film 10 via the seal part 11 common to the positive electrode lead 30 and the negative electrode lead 40. Thus, the positive electrode lead 30 and the negative electrode lead 40 are led out toward a common direction from the outer package film 10. In FIG. 2, the positive electrode lead 30 and the negative electrode lead 40 are depicted as lying on top of each other apparently; however, in actuality, as illustrated in FIGS. 4 and 5, the positive electrode lead 30 and the negative electrode lead 40 do not lie on top of each other but are separated from each other.

As described above, the positive electrode lead 30 and the negative electrode lead 40 are each led to the outside of the outer package film 10 via the seal part 11. Therefore, in the case where the seal part 11 is bent to allow the joint surface 11M to be inclined with respect to the intersection direction R2, the positive electrode lead 30 and the negative electrode lead 40 are each bent together with the seal part 11.

It should be understood that as illustrated in FIG. 4, in the course of being led from the inside to the outside of the outer package film 10, the positive electrode lead 30 and the negative electrode lead 40 are each so bent in the middle as to be leadable to the outside via the seal part 11 common to the positive electrode lead 30 and the negative electrode lead 40.

Specifically, the positive electrode lead 30 includes lead parts 31, 32, and 33. The lead part 31 is one end part (a positive electrode coupling part) lying inside the outer package film 10 and coupled to the battery device 20 (the positive electrode 21). The lead part 32 is the other end part extending from the seal part 11 to the outside of the outer package film 10 while being sandwiched by the seal part 11. The lead part 33 is an intermediate part lying inside the outer package film 10 and coupled to each of the lead parts 31 and 32.

The positive electrode lead 30 is double bent. Specifically, in order for the positive electrode lead 30 to be guidable from the battery device 20 to the seal part 11, the positive electrode lead 30 is so bent at a coupling point between the lead parts 31 and 33 as to be along the battery device 20. As a result, while the lead part 31 extends along a winding surface of the battery device 20, the lead part 33 extends along a top surface of the battery device 20. Further, in order for the positive electrode lead 30 to be guidable from the inside to the outside of the outer package film 10, the positive electrode lead 30 is so bent at a coupling point between the lead parts 32 and 33 as to be away from the battery device 20. As a result, the lead part 32 extends from the top surface of the battery device 20 toward the seal part 11.

The negative electrode lead 40 includes lead parts 41, 42, and 43. The lead part 41 is one end part (a negative electrode coupling part) lying inside the outer package film 10 and coupled to the battery device 20 (the negative electrode 22). The lead part 42 is the other end part extending from the seal part 11 to the outside of the outer package film 10 while being sandwiched by the seal part 11. The lead part 43 is an intermediate part lying inside the outer package film 10 and coupled to each of the lead parts 41 and 42.

The negative electrode lead 40 is double bent, as with the positive electrode lead 30 described above. Specifically, in order for the negative electrode lead 40 to be guidable from the battery device 20 to the seal part 11, the negative electrode lead 40 is so bent at a coupling point between the lead parts 41 and 43 as to be along the battery device 20. As a result, while the lead part 41 extends along the winding surface of the battery device 20, the lead part 43 extends along the top surface of the battery device 20. Further, in order for the negative electrode lead 40 to be guidable from the inside to the outside of the outer package film 10, the negative electrode lead 40 is so bent at a coupling point between the lead parts 42 and 43 as to be away from the battery device 20. As a result, the lead part 42 extends from the top surface of the battery device 20 toward the seal part 11.

It should be understood that the lead part 33 is turned to a direction away from the lead part 43 so as not to come into contact with the lead part 43 before reaching the seal part 11. Further, the lead part 43 is turned to a direction away from the lead part 33 so as not to come into contact with the lead part 33 before reaching the seal part 11.

Here, if attention is focused on a state where the lead part 31 is coupled to the battery device 20 (the positive electrode 21), as illustrated in FIG. 5, the lead part 31 is inclined with respect to the joint surface 11M. For simplifying the illustration, FIG. 5 illustrates a state where the lead part 31 is inclined with respect to a line segment L2 along the joint surface 11M.

Further, if attention is focused on a state where the lead part 41 is coupled to the battery device 20 (the negative electrode 22), as illustrated in FIG. 5, the lead part 41 is inclined with respect to the joint surface 11M. FIG. 5 illustrates a state where the lead part 41 is inclined with respect to the line segment L2 along the joint surface 11M, as with the lead part 31 described above.

A reason why the lead parts 31 and 41 are each inclined with respect to the line segment L2 (the joint surface 11M) is that this allows each of the positive electrode lead 30 and the negative electrode lead 40 to be guided to the seal part 11 common thereto even though the positive electrode lead 30 (the lead part 31) and the negative electrode lead 40 (the lead part 41) are disposed not to lie on top of each other. As a result, it is possible for the positive electrode lead 30 and the negative electrode lead 40 to be led to the outside of the outer package film 10 via the seal part 11 common thereto as described above.

An angle $\theta 1$ at which the lead part 31 is inclined with respect to the line segment L2 is not particularly limited. An angle $\theta 2$ at which the lead part 41 is inclined with respect to the line segment L2 is not particularly limited. Specifically, the angles $\theta 1$ and $\theta 2$ are each within a range greater than 0° and smaller than 90°, preferably from 5° to 85°, both inclusive. A reason for this is that this makes it easier for each of the positive electrode lead 30 and the negative electrode lead 40 to be guided to the seal part 11.

The sealing film 51 is a member provided in a gap between the outer package film 10 and the positive electrode lead 30 in the seal part 11 and sealing the gap.

Here, because the portions of the outer package film 10 mutually opposed at the opening 10K are joined to each other, the sealing film 51 is disposed between one of the mutually opposed portions of the outer package film 10 and the positive electrode lead 30, and is also disposed between the other of the mutually opposed portions of the outer package film 10 and the positive electrode lead 30. Here, a mounting range of the sealing film 51 is extended to the outside of the outer package film 10.

The sealing film 51 includes one or more of polymer compounds, including polyolefin, that adhere to the positive electrode lead 30. Although not limited to a particular kind, examples of the polyolefin include polyethylene and polypropylene.

The sealing film 52 is a member provided in a gap between the outer package film 10 and the negative electrode lead 40 in the seal part 11 and sealing the gap.

Here, because the portions of the outer package film 10 mutually opposed at the opening 10K are joined to each other, the sealing film 52 is disposed between one of the mutually opposed portions of the outer package film 10 and the negative electrode lead 40, and is also disposed between the other of the mutually opposed portions of the outer package film 10 and the negative electrode lead 40. Here, a mounting range of the sealing film 52 is extended to the outside of the outer package film 10, as with the mounting range of the sealing film 51 described above.

The sealing film 52 includes one or more of polymer compounds, including polyolefin, that adhere to the negative electrode lead 40. The kind of the polyolefin described above in relation to the sealing film 51 similarly applies here.

The secondary battery operates in a manner described below. Upon charging, in the battery device 20, lithium is extracted from the positive electrode 21, and the extracted lithium is inserted into the negative electrode 22 via the electrolytic solution. Upon discharging, in the battery device 20, lithium is extracted from the negative electrode 22, and the extracted lithium is inserted into the positive electrode 21 via the electrolytic solution. In these cases, the lithium is inserted and extracted in an ionic state.

Figure 6:
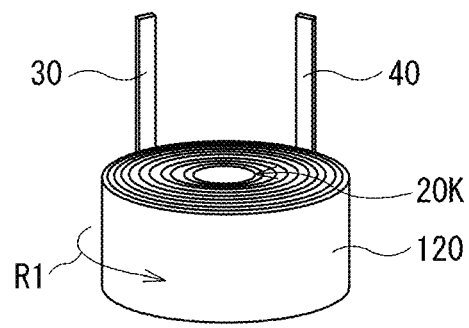
FIG. 6 is a perspective diagram for describing a process of manufacturing the secondary battery according to an embodiment of the technology.
Figure 7A:
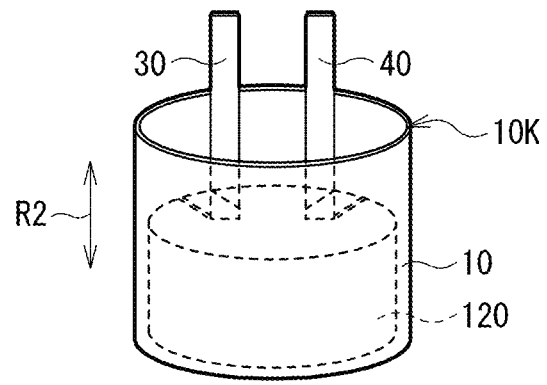
FIG. 7A is a perspective diagram for describing a process of manufacturing the secondary battery that follows FIG. 6 according to an embodiment of the technology.
Figure 7B:
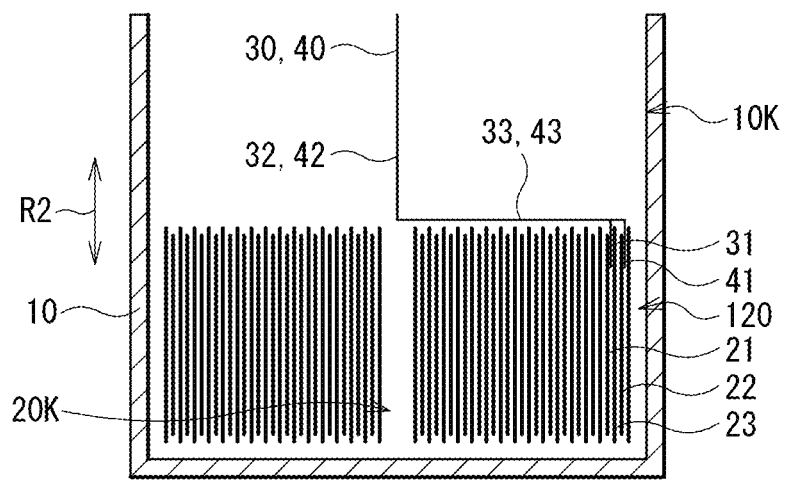
FIG. 7B is a sectional diagram for describing the process of manufacturing the secondary battery corresponding to FIG. 7A according to an embodiment of the technology.
Figure 7C:
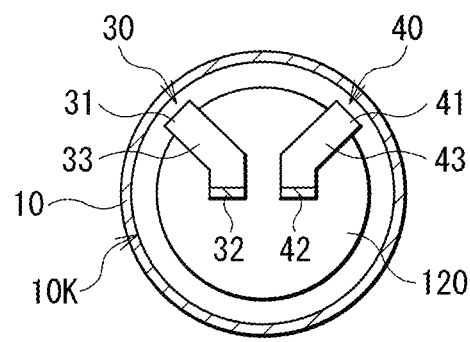
FIG. 7C is a partial sectional diagram for describing the process of manufacturing the secondary battery corresponding to FIG. 7A according to an embodiment of the technology.
Figure 8A:
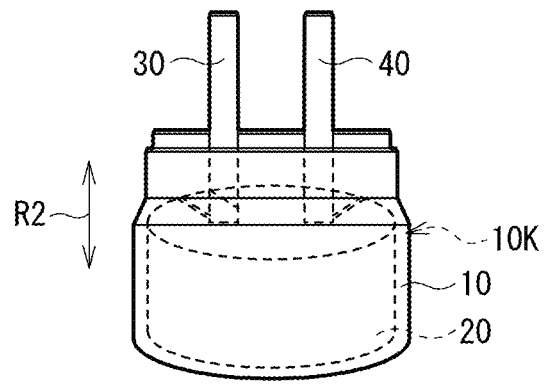
FIG. 8A is a perspective diagram for describing a process of manufacturing the secondary battery that follows FIG. 7A according to an embodiment of the technology.
Figure 8B:
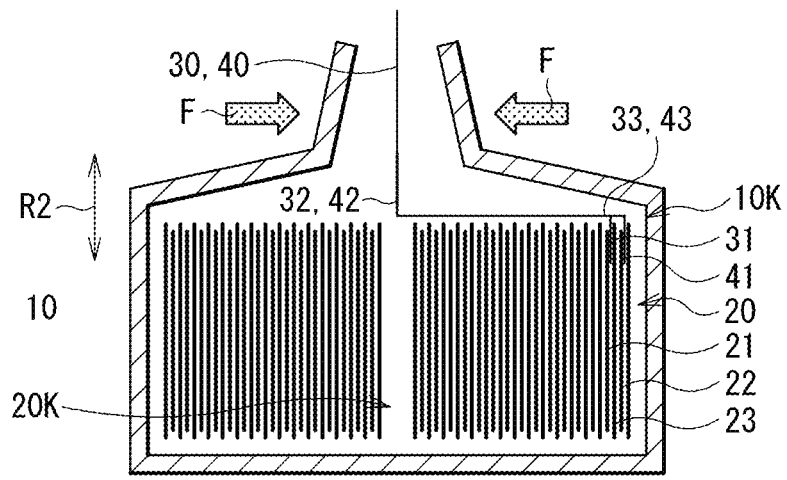
FIG. 8B is a sectional diagram for describing the process of manufacturing the secondary battery corresponding to FIG. 8A according to an embodiment of the technology.
Figure 8C:
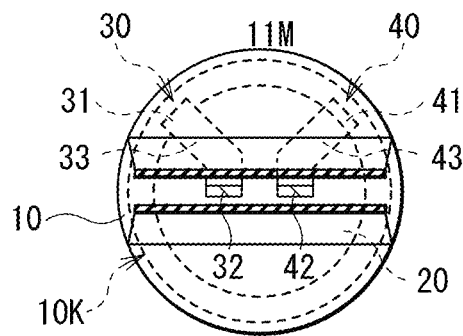
FIG. 8C is a partial sectional diagram for describing the process of manufacturing the secondary battery corresponding to FIG. 8A according to an embodiment of the technology.
Figure 9A:
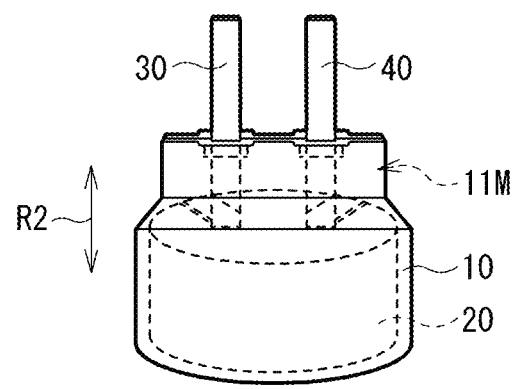
FIG. 9A is a perspective diagram for describing a process of manufacturing the secondary battery that follows FIG. 8A according to an embodiment of the technology.
Figure 9B:
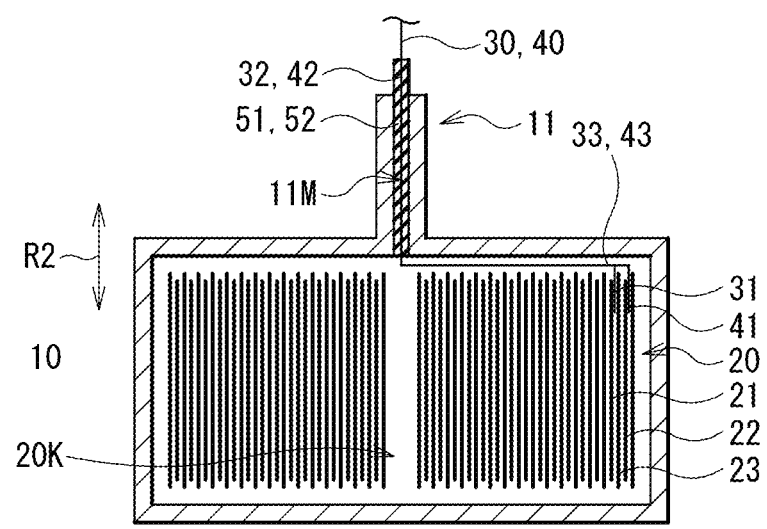
FIG. 9B is a sectional diagram for describing the process of manufacturing the secondary battery corresponding to FIG. 9A according to an embodiment of the technology.
Figure 9C:
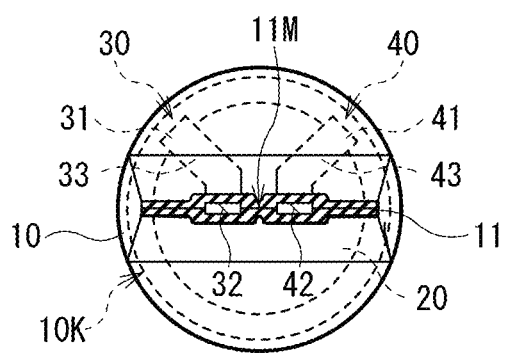
FIG. 9C is a partial sectional diagram for describing the process of manufacturing the secondary battery corresponding to FIG. 9A according to an embodiment of the technology.

To describe a process of manufacturing the secondary battery, FIGS. 6, 7A, 7B, 7C, 8A, 8B, 8C, 9A, 9B, and 9C each illustrate a configuration of the secondary battery in the course of manufacture. FIGS. 6, 7A, 8A, and 9A each illustrate a perspective configuration corresponding to FIG. 1. FIGS. 7B, 8B, and 9B each illustrate a sectional configuration corresponding to FIG. 2. FIGS. 7C, 8C, and 9C each illustrate a partial sectional configuration corresponding to FIG. 4.

In a case of manufacturing the secondary battery, the secondary battery is assembled by a procedure described below. In this case, a wound body 120 (FIGS. 7A to 7C) to be described later is used to fabricate the battery device 20. The wound body 120 has a configuration similar to that of the battery device 20 except that the positive electrode 21, the negative electrode 22, and the separator 23 are each yet to be impregnated with the electrolytic solution. In the following, FIGS. 1 to 5 described already will be referred to when necessary.

First, prepared is a slurry including, without limitation, the positive electrode active material in a solvent such as an organic solvent, following which the slurry is applied on the positive electrode current collector to thereby form the positive electrode active material layer. The positive electrode 21 including the positive electrode current collector and the positive electrode active material layer is thereby fabricated.

Thereafter, prepared is a slurry including, without limitation, the negative electrode active material in a solvent such as an organic solvent, following which the slurry is applied on the negative electrode current collector to thereby form the negative electrode active material layer. The negative electrode 22 including the negative electrode current collector and the negative electrode active material layer is thereby fabricated.

Thereafter, the electrolyte salt is added to a solvent. The electrolytic solution including the solvent and the electrolyte salt is thereby prepared.

Thereafter, the positive electrode lead 30 (the lead part 31) is coupled to the positive electrode 21 (the positive electrode current collector) and the negative electrode lead 40 (the lead part 41) is coupled to the negative electrode 22 (the negative electrode current collector) by a method such as a welding method.

Thereafter, the positive electrode 21 with the positive electrode lead 30 coupled thereto and the negative electrode 22 with the negative electrode lead 40 coupled thereto are stacked on each other with the separator 23 interposed therebetween, following which the positive electrode 21, the negative electrode 22, and the separator 23 are wound in the winding direction R1. The wound body 120 having the winding center space 20K is thereby fabricated, as illustrated in FIG. 6.

Thereafter, as illustrated in FIGS. 7A to 7C, by making use of the angles θ1 and θ2 each falling within the range described above, the positive electrode lead 30 and the negative electrode lead 40 are each double bent, following which the wound body 120 is placed into the outer package film 10. In this case, as described above, with the lead part 31 coupled to the positive electrode 21, the positive electrode lead 30 is bent to allow the lead part 33 to be along a top surface of the wound body 120, following which the positive electrode lead 30 is bent to allow the lead part 32 to be leadable to the outside of the outer package film 10. Further, as described above, with the lead part 41 coupled to the negative electrode 22, the negative electrode lead 40 is bent to allow the lead part 43 to be along the top surface of the wound body 120, following which the negative electrode lead 40 is bent to allow the lead part 42 to be leadable to the outside of the outer package film 10.

The outer package film 10 used here is formed by means of a deep drawing process, as described above. The outer package film 10 thus has a flat and columnar (handleless mug-like) shape with one end open and the other end closed, and has the opening 10K. At the opening 10K, portions of the outer package film 10 are mutually opposed across the opening 10K. Accordingly, the wound body 120 is placed into the outer package film 10 through the opening 10K in such a manner that the positive electrode lead 30 and the negative electrode lead 40 are led to the outside from the outer package film 10.

The outer package film 10 has a sufficient depth to allow a sufficient space to be secured above the wound body 120 in a state where the wound body 120 is contained inside the outer package film 10 shaped like a handleless mug. Accordingly, the positive electrode lead 30 and the negative electrode lead 40 have sufficient lengths to respectively allow the lead parts 32 and 42 to be sufficiently led to the outside of the outer package film 10 in the state where the wound body 120 is contained inside the outer package film 10 shaped like a handleless mug.

Thereafter, the electrolytic solution is injected into the outer package film 10. The wound body 120 (the positive electrode 21, the negative electrode 22, and the separator 23) is thereby impregnated with the electrolytic solution, and as a result, the battery device 20 is fabricated.

Thereafter, as illustrated in FIGS. 8A to 8C, the outer package film 10 is subjected to a pressing process on the opening 10K by means of a machine such as a press working machine including two unillustrated pressure-applying jigs. In the pressing process, the two pressure-applying jigs are pressed against the outer package film 10 from both sides (the right side and the left side of the outer package film 10 in FIGS. 8A to 8C) with the positive electrode lead 30 (the lead part 33) and the negative electrode lead 40 (the lead part 43) interposed between the portions being pressed. Pressing forces F are thus applied to the outer package film 10 from both sides. In this case, in the vicinity of the opening 10K, the outer package film 10 is folded in such a manner that front and back portions of the outer package film 10 are brought close to each other and thereafter both side portions of the outer package film 10 are also brought close to each other. As a result, the lead parts 32 and 42 are sandwiched between the side portions.

Thereafter, the pressing forces F are applied to the outer package film 10 until the portions of the outer package film 10 mutually opposed at the opening 10K come into tight contact with each other with the lead parts 32 and 42 interposed therebetween. As a result, as illustrated in FIGS. 9A to 9C, the portions of the outer package film 10 mutually opposed at the opening 10K are joined to each other with the positive electrode lead 30 and the negative electrode lead 40 interposed therebetween. The seal part 11 including the joint surface 11M is thereby formed. The seal part 11 extends in the intersection direction R2.

In this case, the sealing film 51 is interposed between the outer package film 10 and the positive electrode lead 30, and the sealing film 52 is interposed between the outer package film 10 and the negative electrode lead 40. However, for simplifying the illustration, FIGS. 9A and 9C each omit the illustration of the sealing films 51 and 52.

As a result, the outer package film 10 (the opening 10K) is sealed to provide the seal part 11 with the battery device 20 contained inside the outer package film 10. It should be understood that, inside the outer package film 10 thus sealed, a portion of the electrolytic solution may be stored in an excess space such as the winding center space 20K without any of the positive electrode 21, the negative electrode 22, and the separator 23 being impregnated therewith.

Lastly, the seal part 11 is bent to allow the joint surface 11M to be inclined with respect to the intersection direction R2 (the line segment L1), that is, allow the angle ω to fall within the range described above. As a result, as illustrated in FIGS. 1 and 2, the positive electrode lead 30 and the negative electrode lead 40 are each also bent as the seal part 11 is bent. The secondary battery is thus completed.

In the secondary battery, the battery device 20 is contained inside the outer package film 10 having flexibility and having a flat and columnar shape. The outer package film 10 includes the seal part 11 at one end, and includes no seal part 11 at any position other than the one end. Further, the positive electrode lead 30 coupled to the positive electrode 21 is led to the outside of the outer package film 10 via the seal part 11, and the negative electrode lead 40 coupled to the negative electrode 22 is led to the outside of the outer package film 10 via the seal part 11. In the seal part 11, the mutually opposed portions of the outer package film 10 are joined to each other. As a result, for a reason described below, it is possible to increase the energy density per unit volume of the secondary battery.

Figure 10:
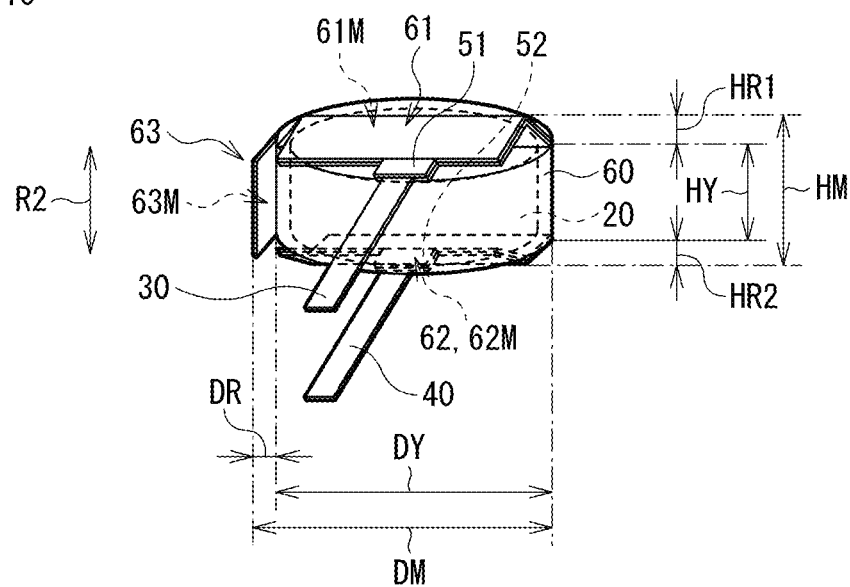
FIG. 10 is a perspective view of a configuration of a secondary battery of a comparative example.
Figure 11:
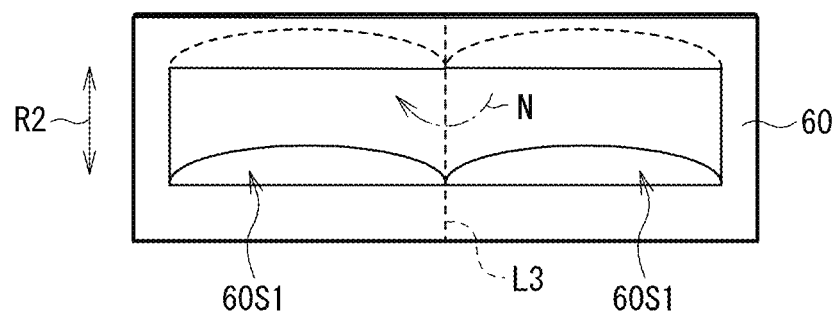
FIG. 11 is a perspective diagram for describing a process of manufacturing the secondary battery of the comparative example illustrated in FIG. 10.
Figure 12:
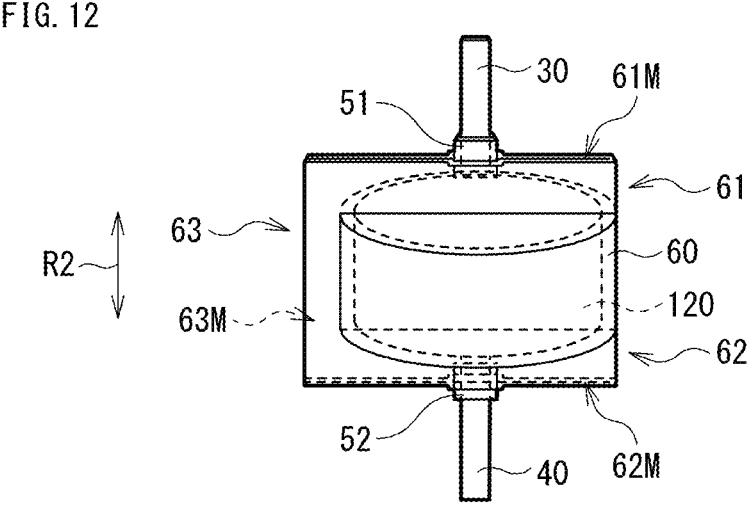
FIG. 12 is a perspective diagram for describing a process of manufacturing the secondary battery of the comparative example that follows FIG. 11.

FIG. 10 illustrates a perspective configuration of a secondary battery of a comparative example, and corresponds to FIG. 1. FIGS. 11 and 12 each illustrate a perspective configuration corresponding to FIG. 10 for describing a process of manufacturing the secondary battery of the comparative example. In each of FIGS. 10 to 12, components similar to those of the secondary battery of the present embodiment are denoted with similar reference signs.

As illustrated in FIG. 10, the secondary battery of the comparative example has a configuration similar to that of the secondary battery of the present embodiment except that an outer package film 60 is provided in place of the outer package film 10, and the positive electrode lead 30 and the negative electrode lead 40 are each led out in a different manner.

Specifically, the outer package film 60 has an enclosed structure sealed at three different locations (three sides), that is, a three-side-seal-type enclosed structure, and thus includes three seal parts 61, 62, and 63. A first one, the seal part 61, is one end (a top end in FIG. 10) in the intersection direction R2, as described above. A second one, the seal part 62, is the other end (a bottom end in FIG. 10) in the intersection direction R2. A third one, the seal part 63, is a side end (the left end in the figure) in a direction intersecting the intersection direction R2.

The positive electrode lead 30 is coupled to the positive electrode 21 at one end, and is led to the outside of the outer package film 60 via the seal part 61 at the other end. The negative electrode lead 40 is coupled to the negative electrode 22 at one end, and is led to the outside of the outer package film 60 via the seal part 62 different from the seal part 61 at the other end.

As illustrated in FIGS. 11 and 12, the secondary battery of the comparative example is manufacturable by procedures similar to those of the method of manufacturing the secondary battery of the present embodiment, except for a difference in a fabrication procedure of the wound body 120 (a step of forming the positive electrode lead 30 and the negative electrode lead 40) and a difference in an assembling procedure of the secondary battery (a step of sealing the outer package film 60).

In a case of forming the positive electrode lead 30 and the negative electrode lead 40, the lead part 31 is coupled to the positive electrode 21 to allow the lead part 32 to be guidable in one direction (the up direction) along the intersection direction R2, and the lead part 41 is coupled to the negative electrode 22 to allow the lead part 42 to be guidable in the other direction (the down direction) along the intersection direction R2.

In a case of sealing the outer package film 60, the outer package film 60 used is a single, bendable film. To allow for placement of the wound body 120 into the outer package film 60 in a bent state in a later step, the outer package film 60 is provided with two deep drawn parts 60S1 and 60S2 at locations opposed to each other in the bent state.

Using the outer package film 60, the battery device 20 is placed into the deep drawn parts 60S1 and 60S2 by so bending the outer package film 60 in a bending direction N as to sandwich the wound body 120, following which the outer package film 60 is subjected to a pressing process on three sides other than the bending location to thereby form the three seal parts 61 to 63. Specifically, at the top end of the outer package film 60, mutually opposed portions of the outer package film 60 are joined to each other with the positive electrode lead 30 interposed therebetween to thereby form the seal part 61 including a joint surface 61M. Further, at the bottom end of the outer package film 60, mutually opposed portions of the outer package film 60 are joined to each other with the negative electrode lead 40 interposed therebetween to thereby form the seal part 62 including a joint surface 62M. Furthermore, at the side end of the outer package film 60, mutually opposed portions of the outer package film 60 are joined to each other to thereby form the seal part 63 including a joint surface 63M.

Thereafter, the seal parts 61, 62, and 63 are each bent. Specifically, the seal part 61 is bent to allow the joint surface 61M to be inclined with respect to the intersection direction R2. Further, the seal part 62 is bent in a direction similar to the bending direction of the seal part 61 to allow the joint surface 62M to be inclined with respect to the intersection direction R2. Furthermore, the seal part 63 is bent in a direction similar to the bending direction of each of the seal parts 61 and 62.

In the secondary battery of the comparative example, as illustrated in FIG. 10, the outer package film 60 has the three-side-seal-type enclosed structure, and therefore the outer package film 60 includes not only the seal part 61 but also the seal part 63. In this case, the device space volume decreases by a volume occupied by the seal part 63.

Specifically, if the height HM of the secondary battery is fixed, the device space volume depends on an effective outer diameter DY of the secondary battery. While the secondary battery of the comparative example has an outer diameter DM, the presence of the seal part 63 results in a loss outer diameter DR. Therefore, the effective outer diameter DY that determines the device space volume is determined by subtracting the loss outer diameter DR from the outer diameter DM. That is, the effective outer diameter DY is calculated in accordance with the following equation: Effective outer diameter DY=Outer diameter DM−Loss outer diameter DR. In this case, the device space volume is determined on the basis of the effective outer diameter DY which is smaller than the outer diameter DM by the loss outer diameter DR; therefore, the device space volume decreases by a volume resulting from the loss outer diameter DR. As a result, a sufficient device space volume is not obtainable, and it is thus difficult to increase the energy density per unit volume of the secondary battery.

In contrast, in the secondary battery of the present embodiment, as illustrated in FIG. 1, the outer package film 10 has the one-side-seal-type enclosed structure. The outer package film 10 thus includes only the seal part 11 corresponding to the seal part 61, and does not include the seal part 63. In this case, unlike the secondary battery of the comparative example described above, the device space volume does not decrease by the volume occupied by the seal part 63, and there is no loss outer diameter DR resulting from the presence of the seal part 63. In this case, the effective outer diameter DY is equal to the outer diameter DM, and the device space volume is therefore determined on the basis of the outer diameter DM. Accordingly, a sufficient device space volume is obtainable, and it is thus possible to increase the energy density per unit volume of the secondary battery.

In addition, in the seal part 11, the portions of the outer package film 10 mutually opposed at the opening 10K may be joined to each other. This makes it possible to provide the outer package film 10 having the one-side-seal-type enclosed structure easily and stably by means of, e.g., a deep drawing process. As a result, an improved battery characteristic is achievable easily and stably. Accordingly, it is possible to achieve higher effects.

Further, the positive electrode lead 30 and the negative electrode lead 40 may each be led to the outside of the outer package film 10 via the seal part 11. This allows the positive electrode lead 30 and the negative electrode lead 40 to be led out in a common direction. As a result, for a reason described below, the device space volume further increases as compared with the secondary battery of the comparative example. Accordingly, it is possible to achieve higher effects.

If the outer diameter DM of the secondary battery is fixed, the device space volume depends on the effective height HY of the secondary battery. In the secondary battery of the comparative example, as illustrated in FIG. 10, the outer package film 60 has the three-side-seal-type enclosed structure, and therefore the outer package film 60 includes not only the seal part 61 but also the seal part 62.

In this case, even if the secondary battery has the height HM, the presence of the seal part 61 results in a loss height HR1, and the presence of the seal part 62 results in a loss height HR2. Therefore, the effective height HY that determines the device space volume is determined by subtracting the loss heights HR1 and HR2 from the height HM. That is, the effective height HY is calculated in accordance with the following equation: Effective height HY=Height HM−(Loss height HR1+Loss height HR2).

The device space volume is thus determined on the basis of the effective height HY which is smaller than the height HM by the loss heights HR1 plus HR2. Therefore, the device space volume decreases by a volume resulting from the loss heights HR1 and HR2. As a result, with the secondary battery of the comparative example, a sufficient device space volume is not obtainable, and it is thus difficult to increase the energy density per unit volume of the secondary battery.

In contrast, in the secondary battery of the present embodiment, as illustrated in FIG. 1, the outer package film 10 has the one-side-seal-type enclosed structure, and therefore the outer package film 10 includes only the seal part 11 corresponding to the seal part 61, and does not include the seal part 62.

In this case, although the presence of the seal part 11 results in the loss height HR (=HR1), there is no loss height HR2 resulting from the presence of the seal part 62. Therefore, unlike in the secondary battery of the comparative example described above, the effective height HY is smaller than the height HM by the loss height HR1. That is, the effective height HY is calculated in accordance with the following equation: Effective height HY=Height HM−Loss height HR1.

The device space volume is thus determined on the basis of the effective height HY which is smaller than the height HM by the loss height HR1. Therefore, unlike in the secondary battery of the comparative example described above, the device space volume decreases only by a volume resulting from the loss height HR1. Accordingly, a sufficient device space volume is obtainable, and it is thus possible to increase the energy density per unit volume of the secondary battery.

Thus, in the secondary battery of the present embodiment, as compared with the secondary battery of the comparative example, the device space volume increases in terms of not only the effective outer diameter DY but also the effective height HY. Accordingly, it is possible to further increase the energy density per unit volume.

It should be understood that although the description here has been given of a case where the secondary battery of the comparative example has the three-side-seal-type enclosed structure, the above-described advantage of providing an increased device space volume in terms of the effective height HY is similarly obtainable also relative to a case where the secondary battery of the comparative example has a two-side-seal-type enclosed structure.

More specifically, in a case where the secondary battery of the comparative example having the two-side-seal-type enclosed structure includes the seal parts 61 and 62 only, the loss heights HR1 and HR2 result and therefore the effective height HY decreases, as with the case of having the three-side-seal-type enclosed structure described above. As a result, the device space volume decreases by the volume resulting from the loss heights HR1 and HR2, and it is thus difficult to increase the energy density per unit volume of the secondary battery.

In contrast, in the case where the secondary battery of the present embodiment having the one-side-seal-type enclosed structure includes the seal part 11 only, as described above, only the loss height HR1 results. Accordingly, the effective height HY increases as compared with the secondary battery of the comparative example having the two-side-seal-type enclosed structure. This results in an increased device space volume, making it possible to increase the energy density per unit volume of the secondary battery.

In addition, in the secondary battery of the present embodiment, the outer package film 10 may be a single member. This makes it possible, as described above, to provide the outer package film 10 having the one-side-seal-type enclosed structure easily and stably by making use of the single outer package film 10 formed by means of, e.g., a deep drawing process. As a result, an improved battery characteristic is achievable easily and stably also from this regard. Accordingly, it is possible to achieve higher effects.

Further, the lead part 31 of the positive electrode lead 30 may be inclined with respect to the joint surface 11M (the line segment L2) and the lead part 41 of the negative electrode lead 40 may be inclined with respect to the joint surface 11M (the line segment L2). This allows the positive electrode lead 30 and the negative electrode lead 40 to be guided and led to the outside of the outer package film 10 via the seal part 11 common thereto even though the positive electrode lead 30 and the negative electrode lead 40 are disposed at positions different from each other. As a result, it becomes possible for the secondary battery to provide stable operations (charging and discharging) through the use of the positive electrode lead 30 and the negative electrode lead 40 that are led out in a common direction, and also it becomes easier to couple the secondary battery to an electronic apparatus. Accordingly, it is possible to achieve higher effects.

Further, the seal part 11 may be bent to allow the joint surface 11M to be inclined with respect to the intersection direction R2. This makes the height HM smaller than in a case where the seal part 11 is not bent. As a result, a relative increase in effective height HY is achieved to increase the device space volume. Accordingly, it is possible to achieve higher effects. In this case, the angle ω at which the seal part 11 is inclined may be 90° or more. This sufficiently reduces the height HM, resulting in a sufficient increase in device space volume. Accordingly, it is possible to achieve even higher effects.

Further, the seal part 11 may be provided at one of the bottom parts M1 and M2. This not only increases the device space volume but also facilitates smooth placement of the battery device 20 into the outer package film 10 in the manufacturing process of the secondary battery, as compared with a case where the seal part 11 is provided at the sidewall part M3. Accordingly, it is possible to achieve higher effects.

Further, in the battery device 20, the positive electrode 21 and the negative electrode 22 may be wound with the separator 23 interposed therebetween. This allows the number of the winds of each of the positive electrode 21 and the negative electrode 22 to increase with an increase in device space volume, thus allowing the positive electrode 21 and the negative electrode 22 to be opposed to each other over a larger area. As a result, the energy density per unit volume increases sufficiently. Accordingly, it is possible to achieve higher effects.

Further, the secondary battery may be a button-type secondary battery having a flat and columnar shape. This makes it possible to achieve higher effects because the energy density per unit volume effectively increases in the small-sized secondary battery which is highly constrained in terms of size.

Further, in the method of manufacturing the secondary battery, the battery device 20 is placed into the outer package film 10 having a flat and columnar shape that has been formed by means of a deep drawing process, following which the outer package film 10 is sealed with the battery device 20 placed inside. The outer package film 10 having the one-side-seal-type enclosed structure is thereby provided easily and stably. Accordingly, it is possible to manufacture the secondary battery with an increased energy density per unit volume.

Here, respective volumetric energy densities (Wh/L (=Wh/dm$^3$)) were logically (mathematically) calculated for the secondary battery of the present embodiment (FIG. 1) and the secondary battery of the comparative example (FIG. 10), and the calculated volumetric energy densities were compared with each other. Table 1 provides the results obtained.

The "Enclosed structure" column in Table 1 indicates the seal form of the enclosed structure (i.e., the one-side-seal type or the three-side-seal type). The "one-side-seal type" is the seal form of the enclosed structure related to the secondary battery of the present embodiment. The "three-side-seal type" is the seal form of the enclosed structure related to the secondary battery of the comparative example. As for configuration conditions of the secondary batteries, the bottom surfaces of the outer package films 10 and 60 were each set to a circular shape, the outer diameters DM were each set to 12 mm, and joining widths of the seal parts 11, 61, 62, and 63 were each set to 1.5 mm. The heights HM (mm) were thereby varied as listed in Table 1. The effective heights HY (mm) and the effective outer diameters DY (mm) were as listed in Table 1.

To calculate the volumetric energy density, first, a maximum volume (dm$^3$) of the secondary battery was calculated on the basis of the outer diameter DM and the height HM. Thereafter, the secondary battery was charged and discharged with an average voltage of 3.8 V to thereby measure a battery capacity (Wh). Lastly, the battery capacity was divided by the maximum volume to thereby calculate the volumetric energy density (Wh/dm$^3$).

TABLE 1

| Enclosed structure | Height HM (mm) | Effective height HY (mm) | Outer diameter DM (mm) | Effective outer diameter DY (mm) | Volumetric energy density (Wh/dm$^3$) |
|---|---|---|---|---|---|
| One-side-seal type | 3 | 2.3 | 12 | 12 | 161 |
| | 5 | 4.3 | 12 | 12 | 373 |
| | 7 | 6.3 | 12 | 12 | 463 |
| | 10 | 9.3 | 12 | 12 | 532 |
| | 15 | 14.3 | 12 | 12 | 585 |
| Three-side-seal type | 3 | 1.6 | 12 | 11.6 | 0 |
| | 5 | 3.6 | 12 | 11.6 | 176 |
| | 7 | 5.6 | 12 | 11.6 | 306 |
| | 10 | 8.6 | 12 | 11.6 | 403 |
| | 15 | 13.6 | 12 | 11.6 | 478 |

As indicated in Table 1, the volumetric energy density varied depending on the configuration of the secondary battery.

Specifically, in the secondary battery of the comparative example having the three-side-seal-type enclosed structure, the presence of both of the seal parts 61 and 62 increases the loss height HR to thereby decrease the effective height HY, and the presence of the seal part 63 increases the loss outer diameter DR to thereby decrease the effective outer diameter DY. This decreases the device space volume, resulting in an insufficient increase in volumetric energy density.

It should be understood that in the secondary battery of the comparative example, the volumetric energy density was 0 Wh/dm$^3$ when the height HM was 3 mm. A reason for this is that the joining widths of the seal parts 61 and 62 were each 1.5 mm and therefore the loss height HR was 3 mm (=1.5 mm+1.5 mm), which resulted in a device space volume of 0 mm$^3$.

In contrast, in the secondary battery of the present embodiment having the one-side-seal-type enclosed structure, the effective height HY increases because the loss height HR is smaller owing to the presence of only the seal part 61, and furthermore, no loss outer diameter DR results because no seal part 63 is present. This increases the device space volume, resulting in a sufficient increase in volumetric energy density.

The results presented in Table 1 indicate that, according to the secondary battery of the present embodiment, as compared with the secondary battery of the comparative example, the device space volume increases because the loss height HR is minimized and no loss outer diameter DR results. This makes it possible to increase the energy density per unit volume.

Next, modifications of the foregoing secondary battery will be described. The configuration of the secondary battery is appropriately modifiable, as will be described below. It should be understood that any two or more of the following series of modifications may be combined.

[Modification 1]

In FIG. 1, the outer package film 10 has a cylindrical three-dimensional shape; however, the three-dimensional shape of the outer package film 10 is not particularly limited. Specifically, the three-dimensional shape of the outer package film 10 may be a different columnar shape, such as a quadrangular prism shape. In this case also, the outer package film 10 having the one-side-seal-type enclosed structure increases the device space volume, thus making it possible to achieve similar effects.

[Modification 2]

In FIG. 1, a single positive electrode lead 30 is provided; however, the number of the positive electrode leads 30 is not particularly limited, and may be two or more. In this case also, the outer package film 10 having the one-side-seal-type enclosed structure increases the device space volume, thus making it possible to achieve similar effects. In this case, in particular, increasing the number of the positive electrode leads 30 reduces electrical resistance of the secondary battery (the battery device 20). This makes it possible to achieve higher effects.

Modification 2 described here applies also to the negative electrode lead 40. Thus, the number of the negative electrode leads 40 is not particularly limited to one, and may be two or more.

[Modification 3]

The positive electrode lead 30 may be physically separated from the positive electrode current collector and thereby provided as a component separate from the positive electrode current collector. Alternatively, the positive electrode lead 30 may be physically coupled to the positive electrode current collector and thereby integrated with the positive electrode current collector. In the latter case, in a process of forming the positive electrode 21 by means of a punching process on a metal foil, the positive electrode current collector after forming the positive electrode active material layer thereon may be punched into a configuration in which the positive electrode lead 30 and the positive electrode current collector are integrated with each other. It is thereby possible to form the positive electrode 21 including the positive electrode current collector integrated with the positive electrode lead 30. In this case also, electrical conduction between the positive electrode lead 30 and the positive electrode current collector is secured. Accordingly, it is possible to achieve similar effects.

Modification 3 described here is also applicable to the negative electrode lead 40 and the negative electrode current collector. More specifically, the negative electrode lead 40 may be separate from the negative electrode current collector or may be integrated with the negative electrode current collector. In this case also, electrical conduction between the negative electrode lead 40 and the negative electrode current collector is secured. Accordingly, it is possible to achieve similar effects.

Although the technology has been described above with reference to some embodiments and examples, configurations of the technology are not limited to those described with reference to the embodiments and examples above, and are therefore modifiable in a variety of ways.

Specifically, while a description has been given of a case of using a liquid electrolyte (an electrolytic solution), the electrolyte is not limited to a particular kind. Thus, a gel electrolyte (an electrolyte layer) may be used, or an electrolyte in a solid form (a solid electrolyte) may be used.

Further, while a description has been given of a case where the battery device has a wound-type device structure (a wound electrode body), the device structure of the battery device is not particularly limited, and any of other device structures may be chosen. Examples of the other device structures include a stacked-type device structure (a stacked electrode body) where the positive electrode and the negative electrode are stacked on each other with the separator interposed therebetween, and a zigzag-folded-type device structure where the positive electrode and the negative electrode are folded in a zigzag shape with the separator interposed therebetween.

Further, while a description has been given of a case where the electrode reactant is lithium, the electrode reactant is not particularly limited. Specifically, the electrode reactant may be, as described above, another alkali metal, such as sodium or potassium, or may be an alkaline earth metal, such as beryllium, magnesium, or calcium. Other than the above, the electrode reactant may be another light metal, such as aluminum.

The effects described herein are mere examples. Therefore, the effects of the technology are not limited to the effects described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   a battery device including a positive electrode and a negative electrode;
   an outer package member having flexibility, wherein the outer package member accommodates the battery device, and includes a seal part at one end and includes no seal part at any position other than the one end;
   a positive electrode wiring line coupled to the positive electrode and led to an outside of the outer package member via the seal part; and
   a negative electrode wiring line coupled to the negative electrode and led to the outside of the outer package member via the seal part, wherein
   the outer package member has a flat and columnar shape, with a longitudinal axis of the columnar shape extending in the columnar direction,
   the outer package member has an enclosed structure sealed only at one location on one side of the battery device, and
   in the seal part, mutually opposed portions in the columnar shape of the outer package member are joined to each other where the seal part includes a joint surface in which the mutually opposed portions of the outer package member are joined to each other and extend along a plane in a direction of the longitudinal axis, and the seal part is bent to allow the joint surface to be inclined at a bent point along the longitudinal axis at the one end, where the bent point is between:
an end of the outer package, and
ends of both of the positive electrode and the negative electrode nearest the one end.

2. The secondary battery according to claim 1, wherein the outer package member includes a single member.

3. The secondary battery according to claim 1, wherein
the positive electrode wiring line includes a positive electrode coupling part inside the outer package member and coupled to the positive electrode,
the negative electrode wiring line includes a negative electrode coupling part inside the outer package member and coupled to the negative electrode, and
the positive electrode coupling part and the negative electrode coupling part are each inclined with respect to the joint surface.

4. The secondary battery according to claim 2, wherein
the positive electrode wiring line includes a positive electrode coupling part inside the outer package member and coupled to the positive electrode,
the negative electrode wiring line includes a negative electrode coupling part inside the outer package member and coupled to the negative electrode, and
the positive electrode coupling part and the negative electrode coupling part are each inclined with respect to the joint surface.

5. The secondary battery according to claim 1, wherein an angle at which the joint surface is inclined is greater than or equal to 90 degrees.

6. The secondary battery according to claim 1, wherein
the outer package member includes a pair of bottom parts, and a sidewall part between the bottom parts, and
the seal part is provided at one of the bottom parts.

7. The secondary battery according to claim 2, wherein
the outer package member includes a pair of bottom parts, and a sidewall part between the bottom parts, and
the seal part is provided at one of the bottom parts.

8. The secondary battery according to claim 3, wherein
the outer package member includes a pair of bottom parts, and a sidewall part between the bottom parts, and
the seal part is provided at one of the bottom parts.

9. The secondary battery according to claim 4, wherein
the outer package member includes a pair of bottom parts, and a sidewall part between the bottom parts, and
the seal part is provided at one of the bottom parts.

10. The secondary battery according to claim 5, wherein
the outer package member includes a pair of bottom parts, and a sidewall part between the bottom parts, and
the seal part is provided at one of the bottom parts.

11. The secondary battery according to claim 1, wherein
the battery device further includes a separator, and
the positive electrode and the negative electrode are wound with the separator interposed therebetween.

12. The secondary battery according to claim 1, wherein the columnar shape is a circular columnar shape.

13. The secondary battery according to claim 1, wherein the columnar shape is a handleless mug-like shape.

* * * * *